(12) United States Patent
Sun et al.

(10) Patent No.: US 11,836,098 B2
(45) Date of Patent: Dec. 5, 2023

(54) DATA STORAGE APPARATUS AND METHOD, AND READABLE STORAGE MEDIUM

(71) Applicant: Wuxi Hisky Medical Technologies Co., Ltd., Wuxi (CN)

(72) Inventors: Shibo Sun, Wuxi (CN); Qiong He, Wuxi (CN); Jinhua Shao, Wuxi (CN); Jin Sun, Wuxi (CN); Houli Duan, Wuxi (CN)

(73) Assignee: WUXI HISKY MEDICAL TECHNOLOGIES CO., LTD., Wuxi (CN)

( * ) Notice: Subject to any disclaimer, the term of this patent is extended or adjusted under 35 U.S.C. 154(b) by 185 days.

(21) Appl. No.: 17/481,087

(22) Filed: Sep. 21, 2021

(65) Prior Publication Data

US 2022/0004510 A1 Jan. 6, 2022

Related U.S. Application Data

(63) Continuation of application No. PCT/CN2020/071113, filed on Jan. 9, 2020.

(30) Foreign Application Priority Data

Mar. 27, 2019 (CN) .......................... 201910236161.3

(51) Int. Cl.
 *G06F 13/16* (2006.01)
 *G06F 12/14* (2006.01)
(52) U.S. Cl.
 CPC ...... *G06F 13/1673* (2013.01); *G06F 12/1483* (2013.01); *G06F 2212/1052* (2013.01)
(58) Field of Classification Search
 None
 See application file for complete search history.

(56) References Cited

U.S. PATENT DOCUMENTS

| 6,728,212 | B1 * | 4/2004 | Tancevski | .......... | H04Q 11/0066 |
| | | | | | 370/468 |
| 8,296,534 | B1 * | 10/2012 | Gupta | ................. | G06F 12/0804 |
| | | | | | 711/173 |

(Continued)

FOREIGN PATENT DOCUMENTS

| CN | 1305293 A | 7/2001 |
| CN | 101021833 A | 8/2007 |

(Continued)

OTHER PUBLICATIONS

Extended European Search Report for the parallel application EP20777221.1.

(Continued)

*Primary Examiner* — Elias Mamo
(74) *Attorney, Agent, or Firm* — J.C. PATENTS

(57) ABSTRACT

A data storage apparatus and method and a readable storage medium are provided. The data storage apparatus includes: a processor and a memory; the processor includes: a buffer scheduler, a plurality of transmission buffers, an interface buffer, and a memory controller; the buffer scheduler is configured to control the plurality of transmission buffers to write data, and read out the data and send the data to the interface buffer; the interface buffer is configured to receive data sent by the transmission buffers if a capacity of data stored in the interface buffer is less than a preset capacity threshold, and stop receiving data sent by the transmission buffers if the capacity of data stored in the interface buffer is greater than or equal to the preset capacity threshold; and the memory controller is configured to control the memory to write data from the interface buffer and store the data.

19 Claims, 6 Drawing Sheets

(56) References Cited

U.S. PATENT DOCUMENTS

| | | | |
|---|---|---|---|
| 8,886,844 B2 | 11/2014 | Jandhyam | |
| 9,141,568 B2 | 9/2015 | Biswas | |
| 2006/0146853 A1* | 7/2006 | Paila | H04L 49/90 370/428 |
| 2008/0162737 A1 | 7/2008 | Liu | |
| 2009/0172260 A1 | 7/2009 | Olbrich | |
| 2011/0066820 A1* | 3/2011 | Blundell | G06F 9/3842 711/163 |
| 2011/0179240 A1 | 7/2011 | Sukonik | |
| 2013/0254433 A1* | 9/2013 | Lu | G06F 13/28 710/22 |
| 2014/0101339 A1 | 4/2014 | Jandhyam | |
| 2015/0006762 A1* | 1/2015 | Lee | G06F 13/1673 710/52 |
| 2015/0026128 A1 | 1/2015 | Drobychev | |
| 2018/0081590 A1* | 3/2018 | Farahani | G06F 13/1673 |
| 2018/0295052 A1 | 10/2018 | St-Lautent | |

FOREIGN PATENT DOCUMENTS

| | | |
|---|---|---|
| CN | 101504633 A | 8/2009 |
| CN | 102541458 A | 7/2012 |
| CN | 102833170 A | 12/2012 |
| CN | 105335747 A | 2/2016 |
| CN | 105342642 A | 2/2016 |
| CN | 106803771 A | 6/2017 |
| CN | 107783729 A | 3/2018 |
| CN | 109992205 A | 7/2019 |
| EP | 1100285 A1 | 5/2001 |
| JP | S61242194 A | 10/1986 |
| JP | S6278933 A | 4/1987 |
| JP | H04130561 A | 5/1992 |
| JP | 2002009849 A | 1/2002 |
| JP | 2004206487 A | 7/2004 |
| JP | 2007065948 A | 3/2007 |
| JP | 2016085515 A | 5/2016 |
| KR | 20090075930 A | 7/2009 |
| KR | 101746313 B1 | 7/2015 |
| KR | 20160029803 A | 3/2016 |
| RU | 2598594 C2 | 9/2016 |
| WO | WO2014115309 A1 | 7/2014 |
| WO | WO2018109114 A1 | 6/2018 |

OTHER PUBLICATIONS

Notice of Allowance of the priority CN application No. 201910236161.3.
First Office Action of the parallel application JP2021-557121.
First Office Action of the parallel application RU2021129324.
International Search Report for PCT/CN2020/071113.
First Office Action of the parallel application KR10-2021-7031961.
Second Office Action of the parallel application RU2021129324.
Second Office Action of the parallel application AU2020249862.
First Office Action of the parallel application KR10-2022-0007083.

* cited by examiner

DATA STORAGE APPARATUS AND METHOD, AND READABLE STORAGE MEDIUM

CROSS-REFERENCE TO RELATED APPLICATION

This application is a continuation of International Application No. PCT/CN2020/071113, filed on Jan. 9, 2020, which claims priority to Chinese Patent Application No. 201910236161.3, filed on Mar. 27, 2019. Both of the above applications are hereby incorporated by reference in their entireties.

TECHNICAL FIELD

Embodiments of the present disclosure relate to the field of big data storage technology, and in particular, to a data storage apparatus and method, and a readable storage medium.

BACKGROUND

With the development of the Internet and the progress of science and technology, there has been an explosive growth of data in various technology industries, and a large amount of data has been formed. For example, in the field of ultra-high-speed ultrasound imaging technology, ultra-high-speed ultrasound imaging systems generate a large amount of data. These data need to be stored quickly during the process of large-scale data acquisition.

In the prior art, there is no method for fast storage of massively generated data, resulting in slow storage and low storage efficiency.

SUMMARY

Embodiments of the present disclosure provide a data storage apparatus and method, and a readable storage medium, which solve the technical problem of slow storage and low storage efficiency in the prior art.

In a first aspect, an embodiment of the present disclosure provides a data storage apparatus, including: a processor and a memory; the processor includes: a buffer scheduler, a plurality of transmission buffers, an interface buffer, and a memory controller;
- each of the transmission buffers is connected to the buffer scheduler and the interface buffer, and the interface buffer is connected to the memory through the memory controller;
- the buffer scheduler is configured to control the plurality of transmission buffers to write data, and read out the data and send the data to the interface buffer;
- the interface buffer is configured to receive data sent by the transmission buffers if a capacity of data stored in the interface buffer is less than a preset capacity threshold, and stop receiving data sent by the transmission buffers if the capacity of data stored in the interface buffer is greater than or equal to the preset capacity threshold; and
- the memory controller is configured to control the memory to write data from the interface buffer and store the data.

Further, in the apparatus as described above, the memory controller is specifically configured to control the memory to continuously write data from the interface buffer and store the data.

Further, in the apparatus as described above, the buffer scheduler includes: an entry scheduler and an exit scheduler;
- the entry scheduler is configured to control, according to an entry scheduling state and write token information, a transmission buffer with write permission to write data; and
- the exit scheduler is configured to control, according to an exit scheduling state and read token information, a transmission buffer with read permission to read data.

Further, in the apparatus as described above, the entry scheduling state includes: an idle state and a plurality of transmission buffer write states; and
- the entry scheduler is specifically configured to: if the entry scheduling state is the idle state and the write token information is certain write token information, control a transition from the idle state to a transmission buffer write state corresponding to the certain write token information, and control the transmission buffer to write data.

Further, in the apparatus as described above, the entry scheduler is further configured to, if data written by a current transmission buffer reaches a first preset length value, update a current transmission buffer write state to the idle state and update current write token information to another write token information.

Further, in the apparatus as described above, the entry scheduler is specifically configured to determine a transmission buffer with a longest wait time for writing according to a wait time for writing of each transmission buffer, and update the current write token information to write token information of the transmission buffer with the longest wait time for writing.

Further, in the apparatus as described above, the exit scheduling state includes: an interface buffer detection state and a plurality of transmission buffer read states;
- the exit scheduler is specifically configured to: if the exit scheduling state is the interface buffer detection state and the read token information is certain read token information, control a transition from the interface buffer detection state to a transmission buffer read state corresponding to the certain read token information, and control the transmission buffer to read data.

Further, in the apparatus as described above, the exit scheduler is further configured to, if data read by a current transmission buffer reaches a second preset length value, update a current transmission buffer read state to the interface buffer detection state, and update current read token information to another read token information.

Further, in the apparatus as described above, the exit scheduler is specifically configured to determine a transmission buffer with a longest wait time for reading according to a wait time for reading of each transmission buffer, and update the current read token information to read token information of the transmission buffer with the longest wait time for reading.

Further, in the apparatus as described above, the data is a high frame rate ultrasonic echo signal, the apparatus further includes: a transmitting and receiving array component, and the processor further includes: at least one sliding window controller;
- the transmitting and receiving array component is connected to each sliding window controller;
- the transmitting and receiving array component is configured to transmit an ultrasonic excitation signal and receive the high frame rate ultrasonic echo signal; and
- the sliding window controller is configured to filter the high frame rate ultrasonic echo signal according to a sliding window parameter to obtain a signal to be stored, and send the signal to be stored to a corresponding transmission buffer under control of the buffer scheduler.

In a second aspect, an embodiment of the present disclosure provides a data storage method, including: controlling, by a buffer scheduler, a plurality of transmission buffers to write data, and read out the data and send the data to an interface buffer;
if a capacity of data stored in the interface buffer is less than a preset capacity threshold, receiving, by the interface buffer, data sent by the transmission buffers, and if the capacity of data stored in the interface buffer is greater than or equal to the preset capacity threshold, stopping, by the interface buffer, receiving data sent by the transmission buffers; and
controlling, by a memory controller, a memory to write data from the interface buffer and store the data.

Further, in the method as described above, the controlling, by a memory controller, a memory to write data from the interface buffer and store the data specifically includes:
controlling, by the memory controller, the memory to continuously write data from the interface buffer and store the data.

Further, in the method as described above, the buffer scheduler includes: an entry scheduler and an exit scheduler;
the controlling, by a buffer scheduler, a plurality of transmission buffers to write data, and read out the data and send the data to an interface buffer specifically includes:
controlling, by the entry scheduler, according to an entry scheduling state and write token information, a transmission buffer with write permission to write data; and
controlling, by the exit scheduler, according to an exit scheduling state and read token information, a transmission buffer with read permission to read data.

Further, in the method as described above, the entry scheduling state includes: an idle state and a plurality of transmission buffer write states; and
the controlling, by the entry scheduler, according to an entry scheduling state and write token information, a transmission buffer with write permission to write data specifically includes:
if the entry scheduling state is the idle state and the write token information is certain write token information, controlling a transition from the idle state to a transmission buffer write state corresponding to the certain write token information, and controlling the transmission buffer to write data.

Further, in the method as described above, after the controlling the transmission buffer to write data, the method further includes:
if data written by a current transmission buffer reaches a first preset length value, updating, by the entry scheduler, a current transmission buffer write state to the idle state, and updating current write token information to another write token information.

Further, in the method as described above, the updating current write token information to another write token information specifically includes:
determining, by the entry scheduler, a transmission buffer with a longest wait time for writing according to a wait time for writing of each transmission buffer, and updating the current write token information to write token information of the transmission buffer with the longest wait time for writing.

Further, in the method as described above, the exit scheduling state includes: an interface buffer detection state and a plurality of transmission buffer read states;
the controlling, by the exit scheduler, according to an exit scheduling state and read token information, a transmission buffer with read permission to read data specifically includes:
if the exit scheduling state is the interface buffer detection state and the read token information is certain read token information, controlling a transition from the interface buffer detection state to a transmission buffer read state corresponding to the certain read token information, and controlling the transmission buffer to read data.

Further, in the method as described above, after the controlling the transmission buffer to read data, the method further includes:
if data read by a current transmission buffer reaches a second preset length value, updating a current transmission buffer read state to the interface buffer detection state, and updating current read token information to another read token information.

Further, in the method as described above, the updating current read token information to another read token information specifically includes:
determining, by the exit scheduler, a transmission buffer with a longest wait time for reading according to a wait time for reading of each transmission buffer, and updating the current read token information to read token information of the transmission buffer with the longest wait time for reading.

Further, in the method as described above, the data is a high frame rate ultrasonic echo signal, and before the controlling, by a buffer scheduler, a plurality of transmission buffers to write data, and read out the data and send the data to an interface buffer, the method further includes:
transmitting, by a transmitting and receiving array component, an ultrasonic excitation signal and receiving the high frame rate ultrasonic echo signal; and
filtering, by a sliding window controller, the high frame rate ultrasonic echo signal according to a sliding window parameter to obtain a signal to be stored, and sends the signal to be stored to a corresponding transmission buffer under the control of the buffer scheduler.

In a third aspect, an embodiment of the present disclosure provides a computer-readable storage medium having a computer program stored thereon, and the computer program is executed by a processor to implement the method described in any item of the second aspect.

Embodiments of the present disclosure provide a data storage apparatus and method, and a readable storage medium. The data storage apparatus includes: a processor and a memory; the processor includes: a buffer scheduler, a plurality of transmission buffers, an interface buffer, and a memory controller; each of the transmission buffers is connected to the buffer scheduler and the interface buffer, and the interface buffer is connected to the memory through the memory controller; the buffer scheduler is configured to control the plurality of transmission buffers to write data, and read out the data and send the data to the interface buffer; the interface buffer is configured to receive data sent by the transmission buffers if a capacity of data stored in the interface buffer is less than a preset capacity threshold, and stop receiving data sent by the transmission buffers if the capacity of data stored in the interface buffer is greater than or equal to the preset capacity threshold; and the memory controller is configured to control the memory to write data from the interface buffer and store the data. Since the buffer scheduler can schedule data in an orderly manner, the interface buffer effectively buffers the large amount of data read in the transmission buffers, which avoids the accumulation of data when the back-end memory performs data writing, and then realizes the rapid storage of data and improves the efficiency of data storage.

It should be understood that the content described in the above content of the present disclosure is not intended to limit the key or important features of the embodiments of the present disclosure, nor is it used to limit the scope of the present disclosure. Other features of the present disclosure will become easy to understand through the following description.

BRIEF DESCRIPTION OF DRAWINGS

In order to more clearly describe the embodiments of the present disclosure or the technical solutions in the prior art, the following will briefly introduce the drawings that need to be used in the description of the embodiments or the prior art. Obviously, the drawings in the following description are some embodiments of the present disclosure. For those of ordinary skill in the art, other drawings can be obtained based on these drawings without creative effort.

REFERENCE NUMERALS

Figure 1:
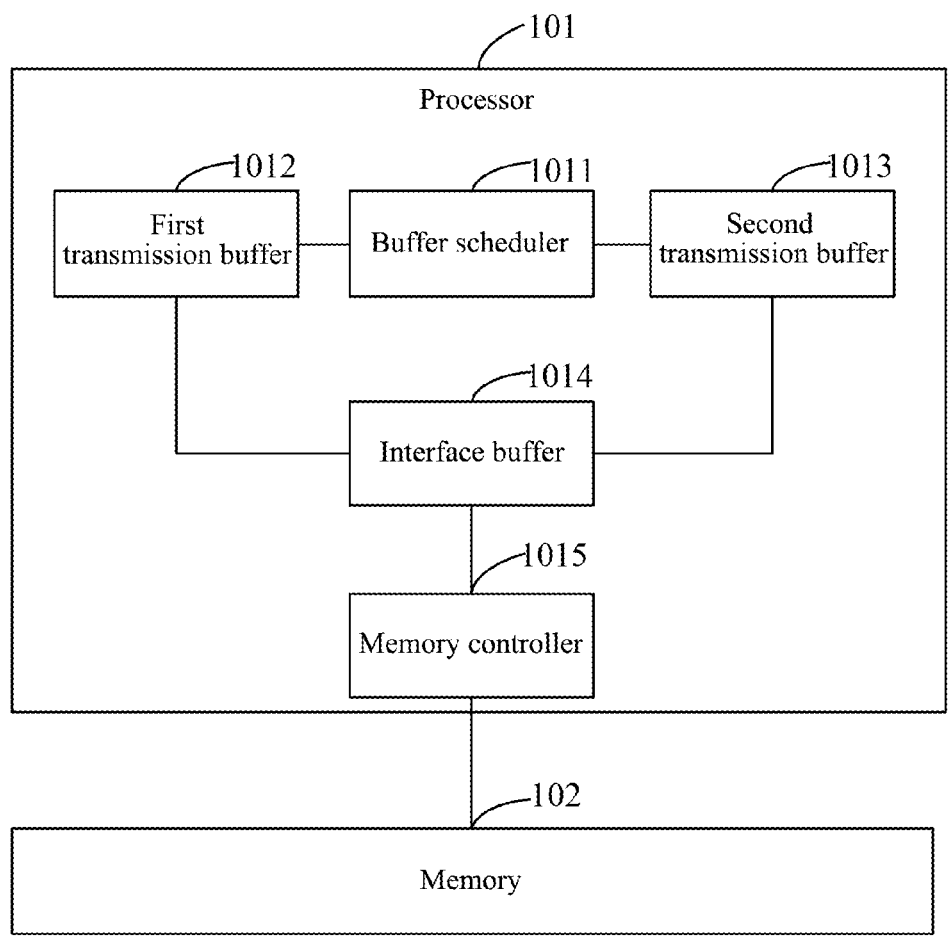
FIG. 1 is a schematic structural diagram of a data storage apparatus provided by Embodiment 1 of the present disclosure.

101—processor 1011—buffer scheduler 1011*a*—entry scheduler 1011*b*—exit scheduler 1012—first transmission buffer 1013—second transmission buffer 1014—interface buffer 1015—memory controller 1016—sliding window controller 102—memory 103—transmitting and receiving array component.

DETAILED DESCRIPTION OF EMBODIMENTS

Hereinafter, embodiments of the present disclosure will be described in more detail with reference to the accompanying drawings. Although some embodiments of the present disclosure are shown in the drawings, it should be understood that the present disclosure can be implemented in various forms, and should not be construed as being limited to the embodiments set forth herein. Instead, these embodiments are provided for a more thorough and complete understanding of the present disclosure. It should be understood that the drawings and embodiments of the present disclosure are only used for illustrative purposes, and are not used to limit the protection scope of the present disclosure.

The terms "first", "second", "third", "fourth", etc. (if any) in the description and claims of the embodiments of the present disclosure and the above-mentioned drawings are used to distinguish similar objects, but not necessarily used to describe a specific order or sequence. It should be understood that the data used in this way can be interchanged under appropriate circumstances, so that the embodiments of the present disclosure described herein can be implemented in an order other than those illustrated or described herein, for example. In addition, the terms "including" and "having" and any variations of them are intended to cover non-exclusive inclusions. For example, processes, methods, systems, products, or apparatuses that include a series of steps or units are not necessarily limited to those clearly listed steps or units, but may include other steps or units that are not clearly listed or are inherent to these processes, methods, products, or apparatuses.

Embodiment 1

FIG. 1 is a schematic structural diagram of a data storage apparatus provided by Embodiment 1 of the present disclosure. As shown in FIG. 1, the data storage apparatus provided by the present embodiment includes: a processor 101 and a memory 102. The processor 101 includes: a buffer scheduler 1011, a plurality of transmission buffers, an interface buffer 1014 and a memory controller 1015.

Among them, each of the transmission buffers is connected to the buffer scheduler 1011 and the interface buffer 1014, and the interface buffer 1014 is connected to the memory 102 through the memory controller 1015.

Specifically, in the present embodiment, the buffer scheduler 1011 is configured to control the plurality of transmission buffers to write data, and read out the data and send the data to the interface buffer 1014. The interface buffer 1014 is configured to receive data sent by the transmission buffers if a capacity of data stored in the interface buffer 1014 is less than a preset capacity threshold, and stop receiving data sent by the transmission buffers if the capacity of data stored in the interface buffer 1014 is greater than or equal to the preset capacity threshold. The memory controller 1015 is configured to control the memory 102 to write data from the interface buffer 1014 and store the data.

In the present embodiment, the specific type of data stored is not limited. The data that needs to be stored is continuously generated data that needs to be continuously stored using the data storage apparatus in the present embodiment. The data may be continuously generated by a data generating unit, and the generated data may be single-frame data or multi-frame data, which is not limited in the present embodiment.

Specifically, in the present embodiment, each transmission buffer is connected to the data generating unit, and the buffer scheduler controls one transmission buffer to write data at a time, where each transmission buffer may have equal write permission, that is, after one transmission buffer writes data, another transmission buffer continues to write data. At the same time, the buffer scheduler controls one transmission buffer at a time to read out the data and send it to the interface buffer 1014. Each transmission buffer also has equal access permission to read data, that is, after one transmission buffer finishes reading data, another transmission buffer continues to read out data.

In FIG. 1, two transmission buffers, which are a first transmission buffer 1012 and a second transmission buffer 1013, respectively, are included.

Specifically, in the present embodiment, each transmission buffer is connected to the interface buffer 1014, which is configured to receive data read by a transmission buffer with read permission. When the interface buffer 1014 receives the data read by the transmission buffer with read permission, it judges whether a capacity of data stored by itself is less than the preset capacity threshold, if the capacity of data stored by itself is less than the preset capacity threshold, it may send a read request to the transmission buffer with read permission, so that the transmission buffer with read permission reads data and sends the data to the interface buffer 1014. If the capacity of data stored by the interface buffer is greater than or equal to the preset capacity threshold, a read stop request may be sent to the transmission buffer with read permission, so that the transmission buffer with read permission no longer reads data, and waits for the capacity of data stored in the interface buffer 1014 to be less than the preset capacity threshold to send data to the interface buffer 1014 again, to ensure that data congestion will not occur in the subsequent data writing process of the memory 102.

The preset capacity threshold may be a total value of capacity that the interface buffer 1014 can store, or may be a value less than the total value of capacity, which is not limited in this embodiment.

Specifically, in the present embodiment, the memory controller 1015 controls the memory 102 to write data from the interface buffer 1014 into the memory 102, and the memory 102 stores the written data.

The data storage apparatus provided by the present embodiment includes: a processor 101 and a memory 102; the processor 101 includes: a buffer scheduler 1011, a plurality of transmission buffers, an interface buffer 1014, and a memory controller 1015; each of the transmission buffers is connected to the buffer scheduler 1011 and the interface buffer 1014, the interface buffer 1014 is connected to the memory 102 through the memory controller 1015; the buffer scheduler 1011 is configured to control the plurality of transmission buffers to write data, and read out the data and send the data to the interface buffer 1014; the interface buffer 1014 is configured to receive data sent by the transmission buffers if a capacity of data stored in the interface buffer 1014 is less than a preset capacity threshold, and stop receiving data sent by the transmission buffers if the capacity of data stored in the interface buffer 1014 is greater than or equal to the preset capacity threshold; and the memory controller 1015 is configured to control the memory 102 to write data from the interface buffer 1014 and store the data. Since the buffer scheduler 1011 can schedule data in an orderly manner, the interface buffer 1014 effectively buffers the large amount of data read in the transmission buffers, which avoids the accumulation of data when the back-end memory 102 performs data writing, and then realizes the rapid storage of data and improves the efficiency of data storage.

Embodiment 2

Figure 2:
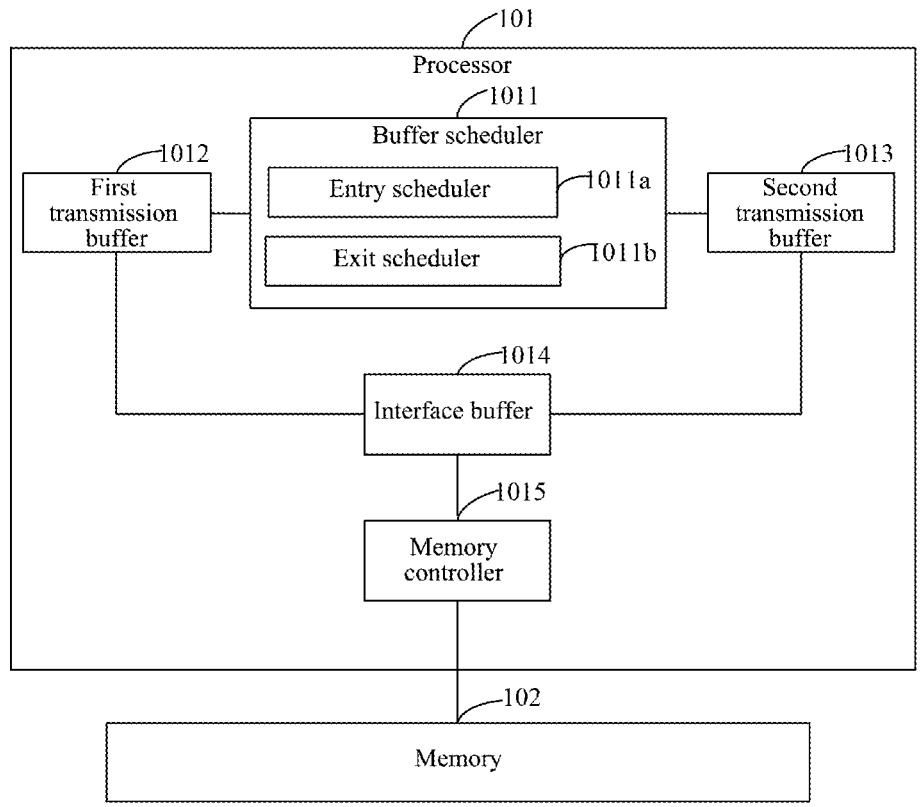
FIG. 2 is a schematic structural diagram of a data storage apparatus according to Embodiment 2 of the present disclosure.

FIG. 2 is a schematic structural diagram of a data storage apparatus according to Embodiment 2 of the present disclosure. As shown in FIG. 2, the data storage apparatus provided in the present embodiment further refines the memory controller 1015 and the buffer scheduler 1011 on the basis of the data storage apparatus provided in Embodiment 1 of the present disclosure, and the data storage apparatus provided in the present embodiment also includes the following technical solutions.

Further, in the present embodiment, the memory controller 1015 is specifically configured to control the memory to continuously write data from the interface buffer and store the data.

Specifically, in the present embodiment, the memory controller 1015 controls the memory 102 to continuously write data from the interface buffer 1014 to the memory 102, and the memory 102 stores the written data to ensure that the data stored in the interface buffer 1014 can be read continuously, which further improves the speed of data storage and further improves the efficiency of data storage.

Further, in the present embodiment, the buffer scheduler 1011 includes: an entry scheduler 1011a and an exit scheduler 1011b.

Further, the entry scheduler 1011a is configured to control, according to an entry scheduling state and write token information, a transmission buffer with write permission to write data. The exit scheduler 1011b is configured to control, according to an exit scheduling state and read token information, a transmission buffer with read permission to read data.

Figure 3:
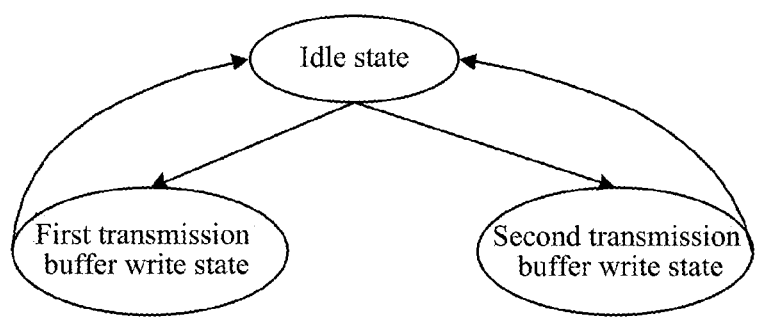
FIG. 3 is a schematic diagram of a transition of an entry scheduling state of an entry scheduler in the data storage apparatus provided by Embodiment 2 of the present disclosure.

Specifically, in the present embodiment, FIG. 3 is a schematic diagram of a transition of the entry scheduling state of the entry scheduler 1011a in the data storage apparatus provided by Embodiment 2 of the present disclosure. As shown in FIG. 3, in the present embodiment, the entry scheduling state includes: an idle state and a plurality of transmission buffer write states, and the idle state is an initial state of the entry scheduler 1011a. If there are two transmission buffers, the plurality of transmission buffer write states include: a first transmission buffer write state and a second transmission buffer write state, where the first transmission buffer write state indicates that the current state is a state of writing by the first transmission buffer 1012, and the second transmission buffer write state indicates that the current state is a state of writing by the second transmission buffer 1013.

The write token information includes an identification of the transmission buffer, and the write token information represents information that a certain transmission buffer has the permission to write data.

Further, in the present embodiment, the entry scheduler 1011a is specifically configured to: if the entry scheduling state is the idle state and the write token information is certain write token information, then control a transition from the idle state to a transmission buffer write state corresponding to the certain write token information, and control the transmission buffer to write data.

Further, the entry scheduler 1011a is further configured to, if data written by a current transmission buffer reaches a first preset length value, update a current transmission buffer write state to the idle state and update current write token information to another write token information.

The first preset length value is a preset length value of data written by each transmission buffer each time. For example, the first preset length value may be 256 bits, or other values, which is not limited in this embodiment.

Further, the entry scheduler 1011a is specifically configured to determine a transmission buffer with a longest wait time for writing according to a wait time for writing of each transmission buffer, and update the current write token information to write token information of the transmission buffer with the longest wait time for writing.

The wait time for writing of the transmission buffer is a time interval from the time when data writing is completed last time to the time when the data writing starts again.

Specifically, in the present embodiment, the entry scheduler 1011a determines a transmission buffer with the longest wait time for writing according to the wait time for writing of each transmission buffer, and updates the current write token information to the write token information of the transmission buffer with the longest wait time for writing, which enables the plurality of transmission buffers to have equal write permission. When data has not been written at the beginning, the wait time for writing of each transmission buffer is the same, and a sequence of the plurality of transmission buffers to write data may be predefined. In the present embodiment, two transmission buffers are used as an example for description. That is, the entry scheduling state includes: an idle state and two transmission buffer write states. In the entry scheduler 1011a, the entry scheduling state is in an initial state at first, and when there is data to be written, the write token information is the first write token information, that is, the first transmission buffer 1012 has the permission to write data, and then, when the entry scheduling state is the idle state and the write token information is the first write token information, a transition is controlled from the idle state to the first transmission buffer write state, the first transmission buffer 1012 is controlled to write data. In the process of writing data by the first transmission buffer 1012, the length of the written data is counted, if the written data of the first transmission buffer 1012 reaches the first preset length value, then the first transmission buffer write state is updated to the idle state, and first write token information is updated. When updating the first write token information, it is determined that the wait time for writing of the second transmission buffer 1013 is longer than the wait time for writing of the first transmission buffer 1012, then the first write token information is updated to the second write token information, which means that the second transmission buffer 1013 has the permission to write data, then a transition is controlled from the idle state to the second transmission buffer write state, and the second transmission buffer 1013 is controlled to write data. This cycle is repeated, so that the two transmission buffers have equal write permission, and write data equally.

In the data storage apparatus provided in this embodiment, the buffer scheduler 1011 includes: an entry scheduler 1011a and an exit scheduler 1011b. The entry scheduler 1011a is configured to control, according to an entry scheduling state and write token information, a transmission buffer with write permission to write data. The entry scheduling state includes: an idle state and a plurality of transmission buffer write states; the entry scheduler 1011a is specifically configured to: if the entry scheduling state is the idle state and the write token information is certain write token information, control a transition from the idle state to a transmission buffer write state corresponding to the certain write token information, and control the transmission buffer to write data. The entry scheduler 1011a is further configured to, if data written by a current transmission buffer reaches a first preset length value, update a current transmission buffer write state to the idle state and update current write token information to another write token information, and the entry scheduler 1011a is specifically configured to determine a transmission buffer with a longest wait time for writing according to a wait time for writing of each transmission buffer, and update the current write token information to write token information of the transmission buffer with the longest wait time for writing. By setting a plurality of entry scheduling states and a plurality pieces of write token information, the plurality of transmission buffers have equal write permission, and each transmission buffer can be quickly scheduled for data writing.

It is worth noting that although FIG. 2 and FIG. 3 only show an embodiment including two transmission buffers and the corresponding two write token information, and those skilled in the art can easily extend it to more than two transmission buffers and the corresponding write token information according to the technical solution disclosed by the present disclosure. Therefore, the number of transmission buffers and the corresponding write token information may be two or more, which is not limited in the present disclosure.

Figure 4:
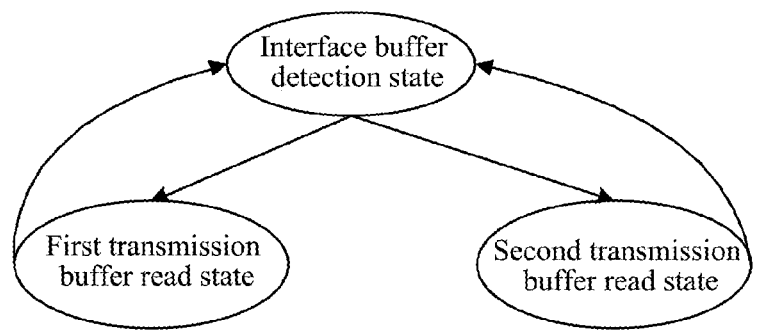
FIG. 4 is a schematic diagram of a transition of an exit scheduling state of an exit scheduler in the data storage apparatus provided by Embodiment 2 of the present disclosure.

Further, in the present embodiment, FIG. 4 is a schematic diagram of a transition of the exit scheduling state of the exit scheduler 1011b in the data storage apparatus provided by Embodiment 2 of the present disclosure. As shown in FIG. 4, in the present embodiment, the exit scheduling state includes: an interface buffer detection state and a plurality of transmission buffer read states.

The interface buffer 1014 detection state is a state of detecting by the interface buffer 1014. If there are two transmission buffers, then the plurality of transmission buffer read states include: a first transmission buffer read state and a second transmission buffer read state, where, the first transmission buffer read state indicates that the current state is a state in which the first transmission buffer 1012 reads data, and the second transmission buffer read state indicates that the current state is a state in which the second transmission buffer 1013 reads data.

Further, in the present embodiment, the exit scheduler 1011b is specifically configured to: if the exit scheduling state is the interface buffer detection state and the read token information is certain read token information, control a transition from the interface buffer detection state to a transmission buffer read state corresponding to the certain read token information, and control the transmission buffer to read data.

The exit scheduler 1011b is further configured to, if data read by a current transmission buffer reaches a second preset length value, update a current transmission buffer read state to the interface buffer detection state, and update current read token information to another read token information.

The read token information includes an identification of the transmission buffer, and the read token information represents information that a certain transmission buffer has the permission to read data.

The second preset length value is a preset length value of data read by each transmission buffer each time. For example, the second preset length value may be 256 bits, or other values, which is not limited in this embodiment.

Further, in the present embodiment, the exit scheduler 1011b is specifically configured to determine a transmission buffer with a longest wait time for reading according to a wait time for reading of each transmission buffer, and update the current read token information to read token information of the transmission buffer with the longest wait time for reading.

The wait time for reading of the transmission buffer is a time interval from the time when the data reading is completed last time to the time when the data reading starts again.

Specifically, in the present embodiment, the exit scheduler 1011b determines the transmission buffer with the longest wait time for reading according to the wait time for reading of each transmission buffer, and updates the current read token information to the read token information of the transmission buffer with the longest wait time for reading, which enables the plurality of transmission buffers to have equal read permission. In the present embodiment, two transmission buffers are used as an example for description. That is, the exit scheduling state includes: an interface buffer detection state, a first transmission buffer read state, and a second transmission buffer read state. In the exit scheduler, the exit scheduling state is in an initial state at first, to read data from a certain transmission buffer and send the data to the interface buffer 1014. If the exit scheduling state is the interface buffer detection state and the read token information is first read token information, then it means that the first transmission buffer 1012 has read permission, the exit scheduling state is controlled to transition from the interface buffer detection state to the first transmission buffer read state, and the first transmission buffer 1012 is controlled to read data. In the process of reading data of the first transmission buffer 1012, the length of the read data is counted, if the read data of the first transmission buffer 1012 reaches the second preset length value, the first transmission buffer read state is updated to the interface buffer detection state, and the first read token information is updated. When updating the first read token information, it is determined that the wait time for reading of the second transmission buffer 1013 is longer than the wait time for reading of the first transmission buffer 1012, then the first read token information is updated to the second read token information, which means that the second transmission buffer 1013 has the permission to read data. After it is detected that the interface buffer 1014 is ready to receive data, the interface buffer detection state is changed to the second transmission buffer read state, and the second transmission buffer 1013 is controlled to read data. This cycle is repeated, so that the two transmission buffers have equal read permission, and read data equally.

When detecting whether the interface buffer 1014 is ready to receive data, it is checked whether the capacity of the data currently stored in the interface buffer 1014 plus the length of the data to be written next time is less than the preset capacity threshold. If so, it means that the interface buffer 1014 is ready to receive data. If the capacity of the currently stored data plus the length of the data to be written next time is greater than the preset capacity threshold, it means that the interface buffer 1014 is not ready to receive data.

In the data storage apparatus provided in this embodiment, the buffer scheduler includes: an exit scheduler 1011b, the exit scheduler 1011b is configured to control, according to an exit scheduling state and read token information, a transmission buffer with read permission to read data, the exit scheduling state includes an interface buffer detection state and a plurality of transmission buffer read states; the exit scheduler 1011b is specifically configured to: if the exit scheduling state is the interface buffer detection state and the read token information is certain read token information, control a transition from the interface buffer detection state to a transmission buffer read state corresponding to the certain read token information, and control the transmission buffer to read data. The exit scheduler 1011b is further configured to, if data read by a current transmission buffer reaches a second preset length value, update a current transmission buffer read state to the interface buffer detection state, and update current read token information to another read token information, and the exit scheduler 1011b is specifically configured to determine a transmission buffer with a longest wait time for reading according to a wait time for reading of each transmission buffer, and update the current read token information to read token information of the transmission buffer with the longest wait time for reading. By setting a plurality of exit scheduling states and a plurality of pieces of write token information, multiple transmission buffers have equal read permission, and each transmission buffer can be quickly scheduled to read data.

Embodiment 3

Figure 5:
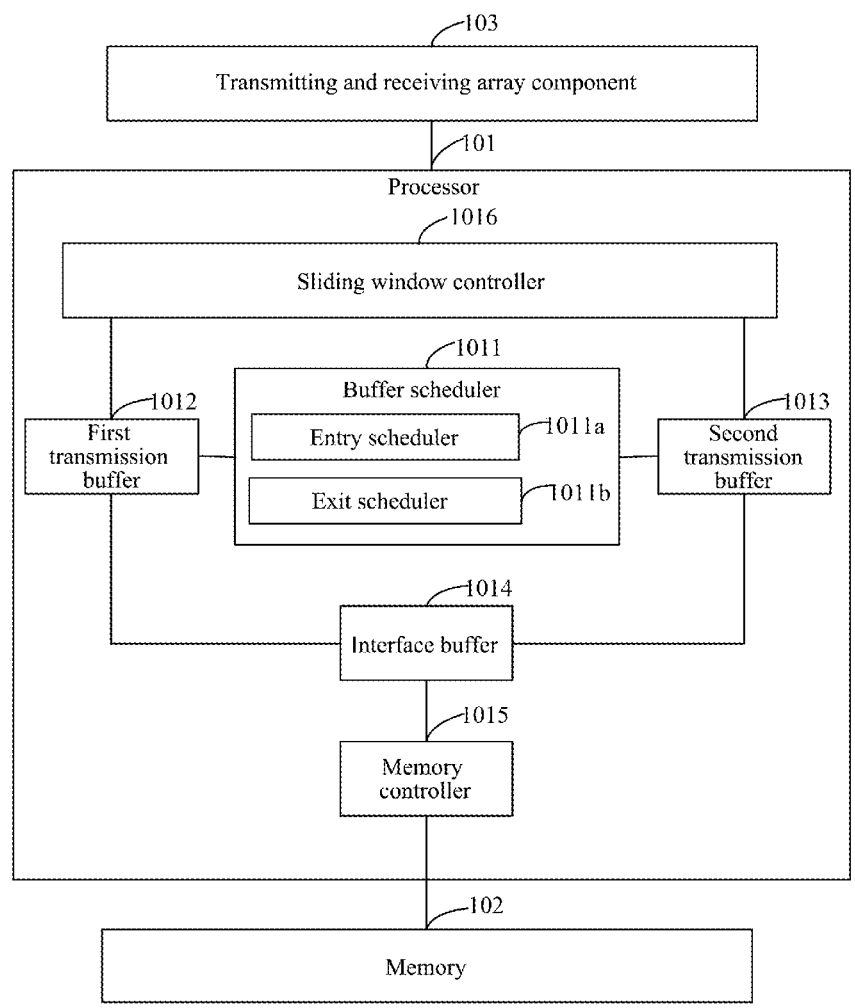
FIG. 5 is a schematic structural diagram of a data storage apparatus provided by Embodiment 3 of the present disclosure.

FIG. 5 is a schematic structural diagram of a data storage apparatus provided by Embodiment 3 of the present disclosure. As shown in FIG. 5, the data storage apparatus provided in this embodiment is based on the data storage apparatus provided in Embodiment 2 of the present disclosure, and the data is a high frame rate ultrasonic echo signal, then the data storage apparatus provided in this embodiment further includes: a transmitting and receiving array component 103, and the processor 101 further includes: at least one sliding window controller 1016.

The transmitting and receiving array component 103 is referred to as T/R array component 103 for short.

The T/R array component 103 is connected to each sliding window controller 1016.

Further, in the present embodiment, the T/R array component 103 is configured to transmit an ultrasonic excitation signal and receive a high frame rate ultrasonic echo signal. The sliding window controller 1016 is configured to filter the high frame rate ultrasonic echo signal according to a sliding window parameter to obtain a signal to be stored, and send the signal to be stored to a corresponding transmission buffer under the control of the buffer scheduler 1011.

The high frame rate ultrasonic echo signal is an echo signal in high frame rate ultrasound imaging. Compared with traditional ultrasound imaging, high frame rate ultrasound imaging has a frame rate much higher than that of traditional ultrasound imaging. More information can be obtained by using the high time resolution of high frame rate ultrasound imaging, but the amount of data used for imaging with high frame rate ultrasound echo signals has increased significantly. When double-precision sampling is used, the sampling rate is 40 MHz, the acquisition depth is 4 cm, and the acquisition channel is 128, then the data volume in this condition is about 10 G per second.

In the present embodiment, the T/R array component 103 is configured to receive a high frame rate ultrasonic echo signal, and then send the high frame rate ultrasonic echo signal to the sliding window controller 1016, and the sliding window controller 1016 can set a sliding window parameter, including a start address and a window length of the sliding window, which is used to screen the high frame rate ultrasound echo signal, and the selected high frame rate ultrasound echo signal may include single frame or multiple frames of echo signals. The unselected echo signal is discarded, the selected high frame rate ultrasonic echo signal is the signal to be stored, and the selected high frame rate ultrasonic echo signal is sent to the corresponding transmission buffer under the control of the buffer scheduler 1011. The corresponding transmission buffer writes the selected high frame rate ultrasonic echo signal. The size of the selected high frame rate ultrasonic echo signal to be written depends on the maximum window length in the sliding window controller 1016. If there are a plurality of sliding window controllers 1016, the size of the selected high frame rate ultrasonic echo signal to be written depends on the maximum window length in the multiple sliding window controllers 1016.

In the data storage apparatus in this embodiment, the structures and functions of the buffer scheduler, transmission buffers, interface buffer 1014, memory controller 1015 and memory 102 are similar to the structures and functions of the corresponding apparatus in the data storage apparatus in Embodiment 2 of the present disclosure, and will not be repeated here.

In the data storage apparatus provided by this embodiment, the data is a high frame rate ultrasonic echo signal, the apparatus further includes: a T/R array component 103, and the processor 101 further includes: at least one sliding window controller 1016; the T/R array component 103 is connected to each sliding window controller 1016; the T/R array component 103 is configured to transmit an ultrasonic excitation signal and receive a high frame rate ultrasonic echo signal; and the sliding window controller 1016 is configured to filter the high frame rate ultrasonic echo signal according to a sliding window parameter to obtain a signal to be stored, and send the signal to be stored to a corresponding transmission buffer under the control of a buffer scheduler 1011, which can quickly collect and store the high frame rate ultrasound signal, and thus improves the collection and storage efficiency of high frame rate ultrasound signal.

Embodiment 4

Figure 6:
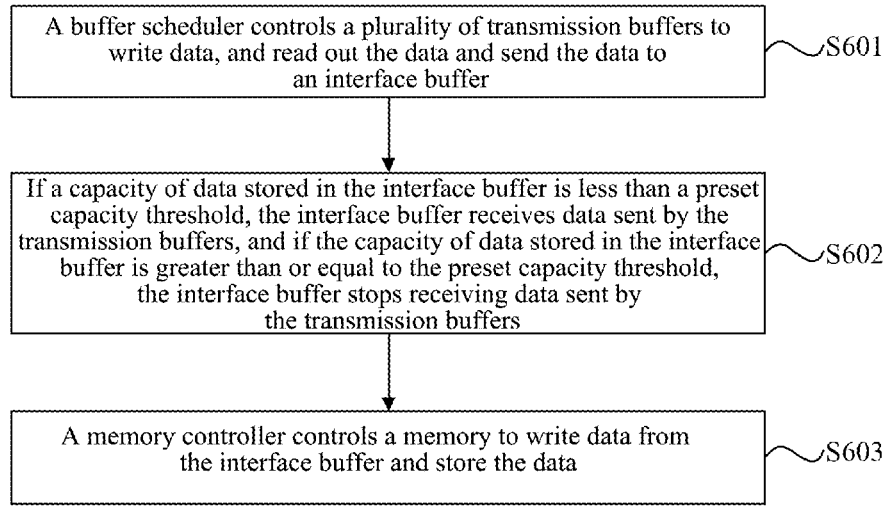
FIG. 6 is a flowchart of the data storage method provided by Embodiment 4 of the present disclosure.

FIG. 6 is a flowchart of a data storage method provided by Embodiment 4 of the present disclosure. As shown in FIG. 6, an executive entity of the data storage method provided in the present embodiment is a data storage apparatus, and the data storage method provided by the present embodiment includes the following steps.

Step 601, a buffer scheduler controls a plurality of transmission buffers to write data, and read out the data and send the data to an interface buffer.

Step 602, if a capacity of data stored in the interface buffer is less than a preset capacity threshold, the interface buffer receives data sent by the transmission buffers, and if the capacity of data stored in the interface buffer is greater than or equal to the preset capacity threshold, the interface buffer stops receiving data sent by the transmission buffers.

Step 603, a memory controller controls a memory to write data from the interface buffer and store the data.

In the present embodiment, the data storage apparatus provided in Embodiment 1 of the present disclosure may be used to implement the technical solution of the data storage method in this embodiment. The implementation principles and technical effects thereof are similar, and will not be repeated here.

Embodiment 5

Figure 7:
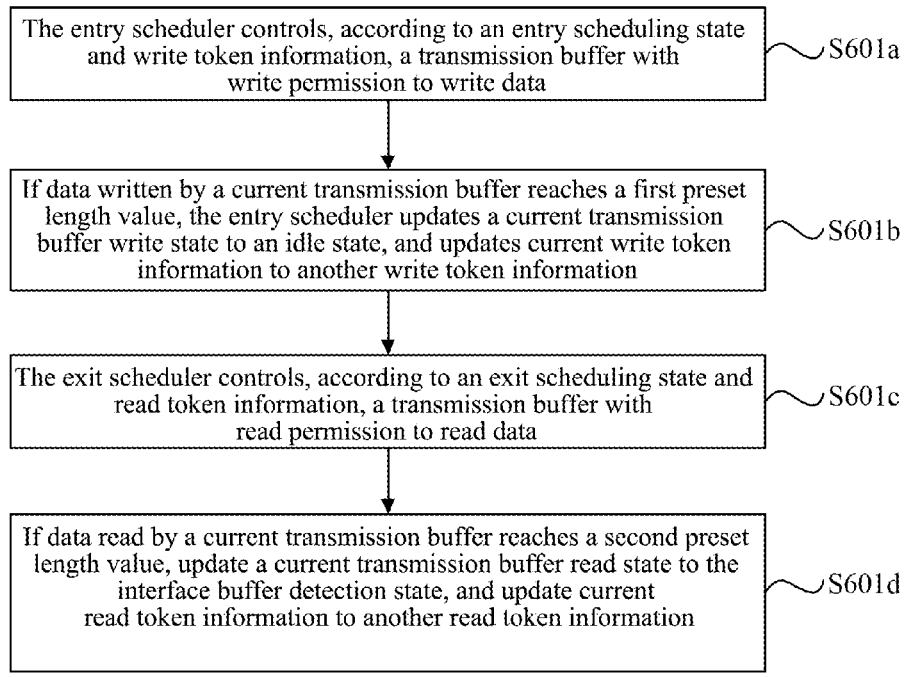
FIG. 7 is a flowchart of a data storage method provided by Embodiment 5 of the present disclosure.

FIG. 7 is a flowchart of a data storage method provided by Embodiment 5 of the present disclosure. As shown in FIG. 7, the data storage method provided in this embodiment is based on the data storage method provided in Embodiment 4 of the present disclosure, and Step 601 and Step 603 are further refined, where the buffer scheduler includes: an entry scheduler and an exit scheduler. In the data storage method provided in this embodiment, Step 601 in Embodiment 4 specifically includes the following steps.

Step 601*a*, the entry scheduler controls, according to an entry scheduling state and write token information, a transmission buffer with write permission to write data.

Further, the entry scheduling state includes: an idle state and a plurality of transmission buffer write states.

Correspondingly, in the present embodiment, the entry scheduler controlling, according to an entry scheduling state and write token information, the transmission buffer with write permission to write data specifically includes:

if the entry scheduling state is the idle state and the write token information is certain write token information, controlling a transition from the idle state to a transmission buffer write state corresponding to the certain write token information, and controlling the transmission buffer to write data.

Step 601*b*, if data written by a current transmission buffer reaches a first preset length value, the entry scheduler updates a current transmission buffer write state to the idle state, and updates current write token information to another write token information.

Further, in the present embodiment, the updating current write token information to another write token information specifically includes:

the entry scheduler determines a transmission buffer with a longest wait time for writing according to a wait time for writing of each transmission buffer, and updates the current write token information to write token information of the transmission buffer with the longest wait time for writing.

Step 601*c*, the exit scheduler controls, according to an exit scheduling state and read token information, a transmission buffer with read permission to read data.

Further, in the present embodiment, the exit scheduling state includes: an interface buffer detection state, and a plurality of transmission buffer read states.

Correspondingly, in the present embodiment, the exit scheduler controlling, according to an exit scheduling state and read token information, a transmission buffer with read permission to read data specifically includes:

if the exit scheduling state is the interface buffer detection state and the read token information is certain read token information, controlling a transition from the interface buffer detection state to a transmission buffer read state corresponding to the certain read token information, and controlling the transmission buffer to read data.

Step 601*d*, if data read by a current transmission buffer reaches a second preset length value, update a current transmission buffer read state to the interface buffer detection state, and update current read token information to another read token information.

Further, in the present embodiment, the updating current read token information to another read token information specifically includes:

the exit scheduler determines a transmission buffer with a longest wait time for reading according to a wait time for reading of each transmission buffer, and updates the current read token information to read token information of the transmission buffer with the longest wait time for reading.

Further, in the present embodiment, Step 603 where the memory controller controls the memory to write data from the interface buffer and store the data specifically includes:

the memory controller controls the memory to continuously write data from the interface buffer and store the data.

In the present embodiment, the data storage apparatus provided in Embodiment 2 of the present disclosure may be used to perform the technical solution of the data storage method in this embodiment. The implementation principles and technical effects thereof are similar, and will not be repeated here.

Embodiment 6

Figure 8:
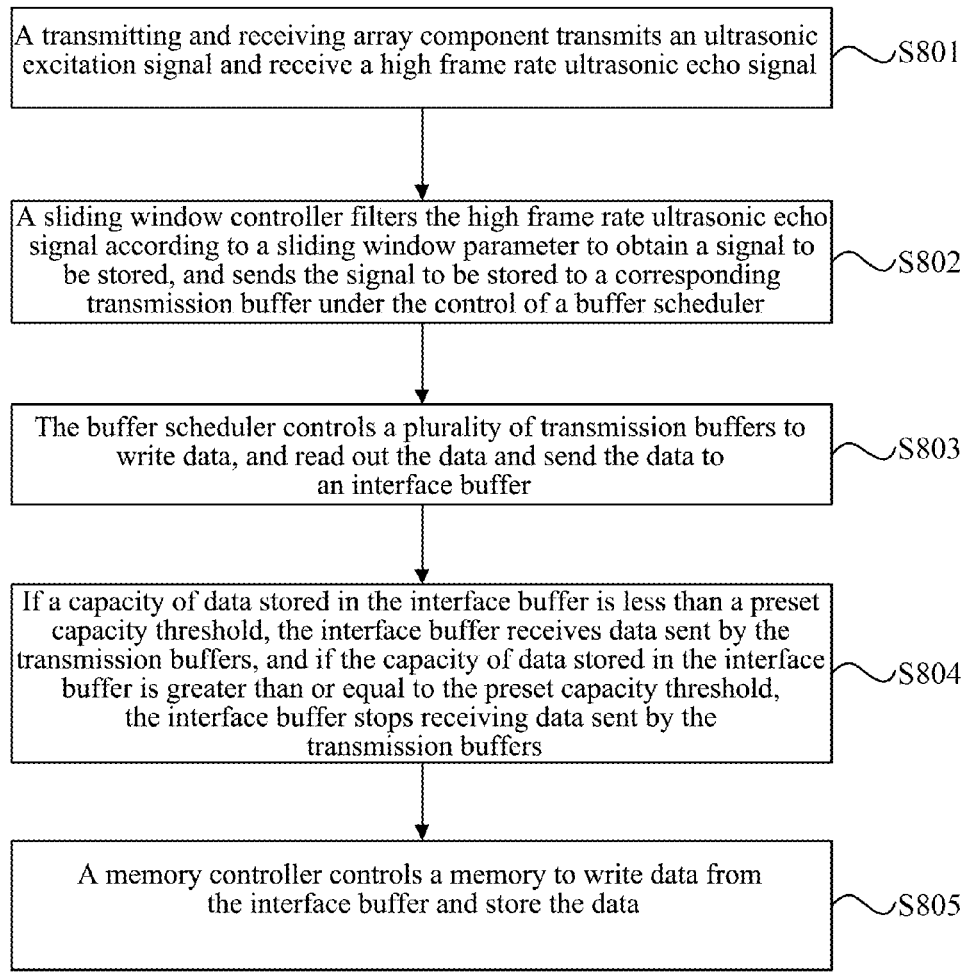
FIG. 8 is a flowchart of a data storage method provided by Embodiment 6 of the present disclosure.

FIG. 8 is a flowchart of a data storage method provided by Embodiment 6 of the present disclosure. As shown in FIG. 8, the data storage method provided in this embodiment is based on the data storage method provided in Embodiment 5 of the present disclosure, and the data is a high frame rate ultrasonic echo signal, then the data storage method provided in this embodiment further includes: a T/R array component transmits an ultrasonic excitation signal and receives the high frame rate ultrasonic echo signal, and a sliding window controller filters the high frame rate ultrasonic echo signal according to a sliding window parameter to obtain a signal to be stored, and sends the signal to be stored to a corresponding transmission buffer under the control of the buffer scheduler. The data storage method provided in this embodiment includes the following steps.

Step 801, a transmitting and receiving array component transmits an ultrasonic excitation signal and receives a high frame rate ultrasonic echo signal.

Step 802, a sliding window controller filters the high frame rate ultrasonic echo signal according to a sliding window parameter to obtain a signal to be stored, and sends the signal to be stored to a corresponding transmission buffer under the control of a buffer scheduler.

Step 803, the buffer scheduler controls a plurality of transmission buffers to write data, and read out the data and send the data to an interface buffer.

In the present embodiment, the implementation manner of Step 803 is the same as the implementation manner of Step 601*a*-Step 601*d* in Embodiment 5 of the present disclosure, and will not be repeated here.

Step 804, if a capacity of data stored in the interface buffer is less than a preset capacity threshold, the interface buffer receives data sent by the transmission buffers, and if the capacity of data stored in the interface buffer is greater than or equal to the preset capacity threshold, the interface buffer stops receiving data sent by the transmission buffers.

Step 805, a memory controller controls a memory to write data from the interface buffer and store the data.

In the present embodiment, the data storage apparatus provided in Embodiment 3 of the present disclosure may be used to implement the technical solution of the data storage method in this embodiment. The implementation principles and technical effects are similar, and will not be repeated here.

Embodiment 7

Embodiment 7 of the present disclosure also provides a computer-readable storage medium which has a computer program stored thereon, and the computer program is executed by a processor to implement the method of any one of Embodiments 1 to 3 of the present disclosure.

In the several embodiments provided by the present disclosure, it should be understood that the disclosed apparatus and method may be implemented in other ways. For example, the apparatus embodiment described above is only illustrative. For example, the division of modules is only a division by logical functions, and there may be other divisions in actual implementation. For example, multiple modules or components may be combined or integrated into another system, or some features may be ignored or not implemented. On the other hand, the displayed or discussed mutual coupling or direct coupling or communication connection may be indirect coupling or communication connection through some interfaces, apparatuses or modules, and may be in electrical, mechanical or other forms.

The modules described as separate components may or may not be physically separate, and the components shown as modules may or may not be physical modules, that is, they may be located in one place, or they may be distributed on multiple network modules. Some or all of the modules may be selected according to actual needs to achieve the purpose of the solution of the embodiments.

In addition, various functional modules in respective embodiments of the present disclosure may be integrated in one processing module, or various modules may exist alone physically, or two or more modules may be integrated in one module. The above-mentioned integrated modules may be implemented in the form of hardware, or in the form of hardware plus software functional modules.

The program codes used to implement the method of the present disclosure may be written in any combination of one or more programming languages. These program codes may be provided to the processor or controller of a general-purpose computer, a special-purpose computer or other programmable data processing apparatus, so that when the program codes are executed by a processor or a controller, the functions/operations specified in the flowcharts and/or block diagrams are implemented. The program codes may be executed entirely on a machine, partly on a machine, partly executed on a machine and partly executed on a remote machine as separate software packages, or entirely executed on a remote machine or server.

In the context of the present disclosure, a machine-readable medium may be a tangible medium, which may contain or store a program for use by an instruction execution system, apparatus, or device or in combination with an instruction execution system, apparatus or device. The machine-readable medium may be a machine-readable signal medium or a machine-readable storage medium. Machine-readable media can include, but are not limited to, electronic, magnetic, optical, electromagnetic, infrared, or semiconductor systems, apparatuses or equipment, or any suitable combination of the foregoing. More specific examples of machine-readable storage media would include electrical connections based on one or more wires, portable computer disks, hard disks, random access memory (RAM), read-only memory (ROM), erasable and programmable read-only memory (EPROM or flash memory), optical fiber, portable compact disk read-only memory (CD-ROM), optical storage devices, magnetic storage devices, or any suitable combination of the foregoing.

In addition, although the operations are depicted in a specific order, this should be understood as requiring such operations to be performed in the specific order shown or in a sequential order, or requiring all illustrated operations to be performed to obtain the desired results. Under certain circumstances, multitasking and parallel processing may be advantageous. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in multiple implementations individually or in any suitable sub-combination.

Although the subject has been described in language specific to structural features and/or logical actions of the method, it should be understood that the subject matter defined in the appended claims is not necessarily limited to the specific features or actions described above. Instead, the specific features and actions described above are merely example forms of implementing the claims.

What is claimed is:

1. A data storage apparatus, wherein the data storage apparatus comprises: a processor and a memory; and the processor comprises: a scheduler, a plurality of transmission buffers, an interface buffer, and a memory controller;
 each of the transmission buffers is connected to the scheduler and the interface buffer, and the interface buffer is connected to the memory through the memory controller;
 the scheduler is configured to control the plurality of transmission buffers to write data, and read out the data and send the data to the interface buffer;
 the interface buffer is configured to receive data sent by the transmission buffers if a capacity of data stored in the interface buffer is less than a preset capacity threshold, and stop receiving data sent by the transmission buffers if the capacity of data stored in the interface buffer is greater than or equal to the preset capacity threshold; and
 the memory controller is configured to control the memory to write data from the interface buffer and store the data;
 wherein the scheduler comprises: a first scheduler and a second scheduler; the first scheduler is specifically configured to control, according to an entry scheduling state and write token information, a transmission buffer with write permission in the plurality of transmission buffers to write data, and the second scheduler is configured to control, according to an exit scheduling state and read token information, a transmission buffer with read permission in the plurality of transmission buffers to read data.

2. The apparatus according to claim 1, wherein the memory controller is specifically configured to control the memory to continuously write data from the interface buffer and store the data.

3. The apparatus according to claim 1, wherein the entry scheduling state comprises: an idle state and a plurality of transmission buffer write states; and
 the first scheduler is specifically configured to: if the entry scheduling state is the idle state and the write token information is certain write token information, control a transition from the idle state to a transmission buffer write state corresponding to the certain write token information, and control the transmission buffer to write data.

4. The apparatus according to claim 3, wherein the first scheduler is further configured to, if data written by a current transmission buffer reaches a first preset length value, update a current transmission buffer write state to the idle state and update current write token information to another write token information.

5. The apparatus according to claim 4, wherein the first scheduler is specifically configured to determine a transmission buffer with a longest wait time for writing according to a wait time for writing of each transmission buffer, and update the current write token information to write token information of the transmission buffer with the longest wait time for writing.

6. The apparatus according to claim 1, wherein the exit scheduling state comprises: an interface buffer detection state and a plurality of transmission buffer read states;
 the second scheduler is specifically configured to: if the exit scheduling state is the interface buffer detection state and the read token information is certain read token information, control a transition from the interface buffer detection state to a transmission buffer read state corresponding to the certain read token information, and control the transmission buffer to read data.

7. The apparatus according to claim 6, wherein the second scheduler is further configured to, if data read by a current transmission buffer reaches a second preset length value, update a current transmission buffer read state to the interface buffer detection state, and update current read token information to another read token information.

8. The apparatus according to claim 7, wherein the second scheduler is specifically configured to determine a transmission buffer with a longest wait time for reading according to a wait time for reading of each transmission buffer, and update the current read token information to read token information of the transmission buffer with the longest wait time for reading.

9. The apparatus according to claim 1, wherein the data is a high frame rate ultrasonic echo signal, the apparatus further comprises: a transmitting and receiving array component, and the processor further comprises: at least one controller;
 the transmitting and receiving array component is connected to each controller;
 the transmitting and receiving array component is configured to transmit an ultrasonic excitation signal and receive the high frame rate ultrasonic echo signal; and
 the controller is configured to filter the high frame rate ultrasonic echo signal according to a sliding window parameter to obtain a signal to be stored, and send the signal to be stored to a corresponding transmission buffer under the control of the scheduler.

10. A data storage method, comprising:
 controlling, by a scheduler, a plurality of transmission buffers to write data, and read out the data and send the data to an interface buffer;
 if a capacity of data stored in the interface buffer is less than a preset capacity threshold, receiving, by the interface buffer, data sent by the transmission buffers, and if the capacity of data stored in the interface buffer is greater than or equal to the preset capacity threshold, stopping, by the interface buffer, receiving data sent by the transmission buffers; and
 controlling, by a memory controller, a memory to write data from the interface buffer and store the data;
 wherein the scheduler comprises: a first scheduler and a second scheduler;
 the controlling, by a scheduler, a plurality of transmission buffers to write data, and read out the data and send the data to an interface buffer specifically comprises: controlling, by the first scheduler, according to an entry scheduling state and write token information, a transmission buffer with write permission in the plurality of transmission buffers to write data; and controlling, by the second scheduler, according to an exit scheduling state and read token information, a transmission buffer with read permission in the plurality of transmission buffers to read data.

11. The method according to claim 10, wherein the entry scheduling state comprises: an idle state and a plurality of transmission buffer write states; and the controlling, by the first scheduler, according to an entry scheduling state and write token information, a transmission buffer with write permission to write data specifically comprises:

if the entry scheduling state is the idle state and the write token information is certain write token information, controlling a transition from the idle state to a transmission buffer write state corresponding to the certain write token information, and controlling the transmission buffer to write data.

12. The method according to claim 11, wherein after the controlling the transmission buffer to write data, the method further comprises:

if data written by a current transmission buffer reaches a first preset length value, updating, by the first scheduler, a current transmission buffer write state to the idle state, and updating current write token information to another write token information.

13. The method according to claim 12, wherein the updating current write token information to another write token information specifically comprises:

determining, by the first scheduler, a transmission buffer with a longest wait time for writing according to a wait time for writing of each transmission buffer, and updating the current write token information to write token information of the transmission buffer with the longest wait time for writing.

14. The method according to claim 10, wherein the exit scheduling state comprises: an interface buffer detection state, and a plurality of transmission buffer read states;

the controlling, by the second scheduler, according to an exit scheduling state and read token information, a transmission buffer with read permission to read data specifically comprises:

if the exit scheduling state is the interface buffer detection state and the read token information is certain read token information, controlling a transition from the interface buffer detection state to a transmission buffer read state corresponding to the certain read token information, and controlling the transmission buffer to read data.

15. The method according to claim 14, wherein after the controlling the transmission buffer to read data, the method further comprises:

if data read by a current transmission buffer reaches a second preset length value, updating, by the second scheduler, a current transmission buffer read state to the interface buffer detection state, and updating current read token information to another read token information.

16. The method according to claim 15, wherein the updating current read token information to another read token information specifically comprises:

determining, by the second scheduler, a transmission buffer with a longest wait time for reading according to a wait time for reading of each transmission buffer, and updating the current read token information to read token information of the transmission buffer with the longest wait time for reading.

17. The method according to claim 10, wherein the data is a high frame rate ultrasonic echo signal, and before the controlling, by a scheduler, a plurality of transmission buffers to write data, and read out the data and send the data to an interface buffer, the method further comprises:

transmitting, by a transmitting and receiving array component, an ultrasonic excitation signal and receiving the high frame rate ultrasonic echo signal; and filtering, by a controller, the high frame rate ultrasonic echo signal according to a sliding window parameter to obtain a signal to be stored, and sending the signal to be stored to a corresponding transmission buffer under the control of the scheduler.

18. A non-transitory computer-readable storage medium, having a computer program stored thereon, wherein the non-transitory computer program is executed by a processor to implement the method according to claim 10.

19. The method according to claim 10, wherein the controlling, by a memory controller, a memory to write data from the interface buffer and store the data specifically comprises:

controlling, by the memory controller, the memory to continuously write data from the interface buffer and store the data.

* * * * *